May 12, 1931.  F. GRAFFENBERGER  1,805,212

PLANT COVER

Filed July 30, 1928

Inventor
Friedrich Graffenberger
By Brown, Jackson, Boettcher Dienner
Attys

Patented May 12, 1931

1,805,212

UNITED STATES PATENT OFFICE

FRIEDRICH GRAFFENBERGER, OF MILWAUKEE, WISCONSIN, ASSIGNOR TO MILWAUKEE LACE PAPER COMPANY, OF MILWAUKEE, WISCONSIN, A CORPORATION OF WISCONSIN

PLANT COVER

Application filed July 30, 1928. Serial No. 296,281.

My invention relates to plant covers and has for its object an article improved to the ends of greater effectiveness and durability.

The fundamental purpose of the device is to protect young vegetation against cold and destruction by inclement weather and to save to the vegetation the benefit of the sun's rays, in the nature of an individual hotbed.

The plant cover of my invention is shown in the accompanying drawings, in which

Figure 1:
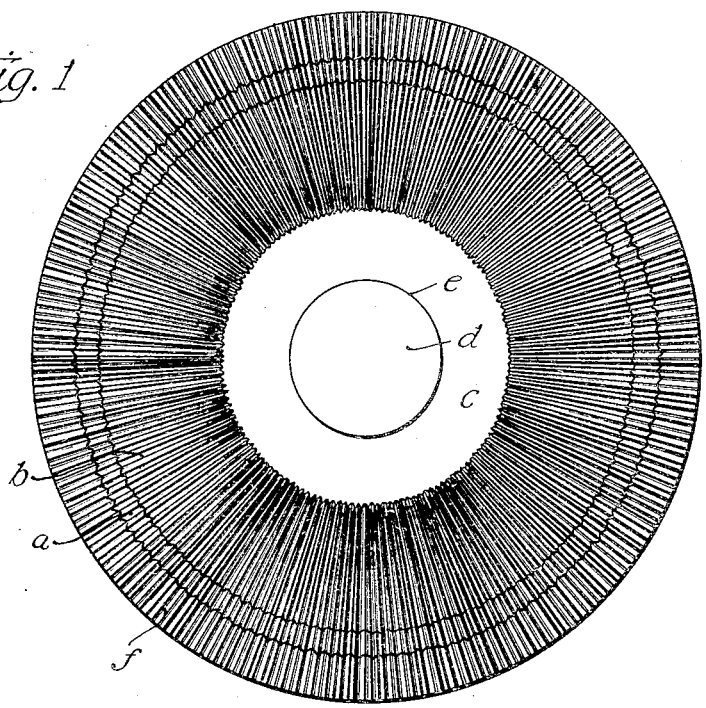
Figure 1 is a plan view thereof.
Figure 2:
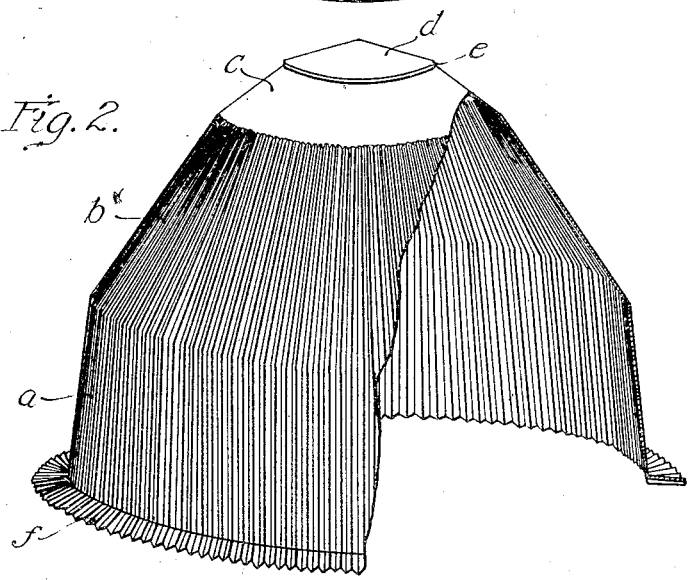
Figure 2 is a perspective view thereof, part being broken away to clarify the illustration.

It is constructed of translucent or more or less transparent paper, either waxed or unwaxed, and in any event fairly waterproof. Also paper known as dry wax or wet waxed, bleached or unbleached, may be used.

It is conveniently manufactured by means of dies from a single circular disk of material and is in the form of a dome comprising a plurality of progressively smaller frusto-conical sections $a$, $b$, $c$ and $d$, an annular vertical shoulder $e$ being formed between sections $c$ and $d$ as shown. The sections $a$ and $b$ are fluted, as shown.

I have found by experiment that a dome so formed has exceptional structural strength, particularly with the fluting of the lower sections and the provision of the shoulder $e$; the fluting also assists in the expediency of manufacture of the device, and in the shedding of rain, and the shoulder $e$ provides a reinforcement against the ready sagging of the top when wet. The fluting, furthermore, increases the surface exposed to the sun's rays.

The dome is of appropriate size and shape to cover an individual young plant, those I have made being each approximately nine inches in diameter and eight inches high upon its vertical axis.

At its lower rim, the dome is provided with an integral horizontally projecting fluted flange $f$, upon which soil may be placed to anchor it in proper position over a plant.

I claim:—

1. A plant cover comprising a dome of translucent material formed of a single sheet of material in a series of frusto-conical sections some of which are fluted.

2. A plant cover comprising a dome formed from a single sheet of translucent material and consisting of a plurality of frusto-conical sections with a vertical shoulder connecting the uppermost section and the next adjacent section for reinforcing the top of said dome.

3. A plant cover comprising a dome of translucent material formed in a series of frusto-conical sections, the lower sections being fluted and the upper sections having a vertical shoulder there-between.

4. A plant cover comprising a dome of translucent material formed in a series of frusto-conical sections, and a horizontally disposed fluted flange at the rim thereof.

5. A plant cover comprising a dome of translucent material formed in a series of progressively smaller frusto-conical sections, some of which are fluted, the fluted sections being formed of a single thickness of material throughout their entire extent.

6. A plant cover comprising a dome of translucent material formed in a series of progressively smaller frusto-conical sections, the lowermost one of which is fluted, and a horizontal fluted flange extending outwardly from the base of said lowermost section.

In witness whereof, I hereunto subscribe my name this 12th day of July, 1928.

FRIEDRICH GRAFFENBERGER.